US009943812B2

United States Patent
Jeon et al.

(10) Patent No.: US 9,943,812 B2
(45) Date of Patent: Apr. 17, 2018

(54) ARTIFICIAL MEMBRANE-FIXED LIQUID FILTRATION STRUCTURE

(71) Applicant: Inha-Industry Partnership Institute, Incheon (KR)

(72) Inventors: Tae Joon Jeon, Yongin-si (KR); Sun Min Kim, Seoul (KR); Hyun Il Ryu, Suwon-si (KR); Hui Soo Jang, Incheon (KR); Sun Hee Yoon, Incheon (KR); Young Ho Seo, Chuncheon-si (KR); Yong Min Park, Chuncheon-si (KR); Eui Don Han, Chuncheon-si (KR); Young Rok Kim, Yongin-si (KR); Yeong Eun Yoo, Seoul (KR); No Won Kim, Busan (KR); Dae Joong Kim, Seoul (KR); Moon Ki Kim, Suwon-si (KR); Seung Hyun Kim, Incheon (KR); Jeong Hwan Kim, Daejeon (KR); Jae Sung Yoon, Daejeon (KR); Yun Jung Lee, Seoul (KR)

(73) Assignee: Inha-Industry Partnership Institute, Incheon (KR)

( * ) Notice: Subject to any disclaimer, the term of this patent is extended or adjusted under 35 U.S.C. 154(b) by 185 days.

(21) Appl. No.: 14/907,685

(22) PCT Filed: Dec. 11, 2015

(86) PCT No.: PCT/KR2015/013586
§ 371 (c)(1),
(2) Date: Jan. 26, 2016

(87) PCT Pub. No.: WO2016/129801
PCT Pub. Date: Aug. 18, 2016

(65) Prior Publication Data
US 2016/0367949 A1    Dec. 22, 2016

(30) Foreign Application Priority Data

Feb. 11, 2015  (KR) .................. 10-2015-0020980

(51) Int. Cl.
*B01D 71/82* (2006.01)
*B01D 69/10* (2006.01)
(Continued)

(52) U.S. Cl.
CPC ............. *B01D 71/82* (2013.01); *B01D 69/10* (2013.01); *B01D 69/142* (2013.01);
(Continued)

(58) Field of Classification Search
None
See application file for complete search history.

(56) References Cited

U.S. PATENT DOCUMENTS 5,552,054 A    9/1996  Koops et al.
7,615,105 B2  11/2009  Odaka et al.
(Continued)

FOREIGN PATENT DOCUMENTS

WO    WO-2012161662 A1 * 11/2012 ............. B01D 69/10
WO    WO-2013044734 A1 *  4/2013 ............ A61K 9/0017

OTHER PUBLICATIONS

Membrane Filters, www.advantecmfs.com, accessed Mar. 29, 2016, 16 pages.

*Primary Examiner* — Chester T Barry
(74) *Attorney, Agent, or Firm* — Rudy J. Ng; Bret E. Field; Bozicevic, Field & Francis LLP

(57) ABSTRACT

The present disclosure relates to a liquid filtration structure with one or more macromolecule membrane structures including membrane proteins selectively permeable to water molecules and fixed within a pore. A liquid filtration structure according to an exemplary embodiment of the present
(Continued)

disclosure increases stability and durability of macromolecule membrane structures including membrane proteins selectively permeable to water molecules, and, thus, can be effectively used in a filtration device for purifying water.

19 Claims, 1 Drawing Sheet

(51) Int. Cl.
  *B01D 69/14* (2006.01)
  *B01D 71/74* (2006.01)
  *C02F 1/44* (2006.01)

(52) U.S. Cl.
  CPC .......... *B01D 69/144* (2013.01); *B01D 71/74* (2013.01); *B01D 2323/30* (2013.01); *C02F 1/44* (2013.01)

(56) References Cited

U.S. PATENT DOCUMENTS

| | | | |
|---|---|---|---|
| 2011/0020950 A1* | 1/2011 | Vogel | B01D 67/006 436/501 |
| 2011/0084026 A1* | 4/2011 | Freger | B01D 69/10 210/653 |
| 2015/0136690 A1* | 5/2015 | Xie | C02F 1/44 210/500.3 |
| 2016/0016127 A1* | 1/2016 | Mentzel | B01D 61/002 415/121.3 |
| 2016/0059190 A1* | 3/2016 | Yoo | B01D 71/82 210/500.25 |

* cited by examiner

ARTIFICIAL MEMBRANE-FIXED LIQUID FILTRATION STRUCTURE

CROSS-REFERENCE TO RELATED APPLICATIONS

This application is based on and claims priority from Korean Patent Application No. 10-2015-0020980, filed on Feb. 11, 2015, with the Korean Intellectual Property Office, the disclosure of which is incorporated herein in its entirety by reference.

TECHNICAL FIELD

The present disclosure relates to a liquid filtration structure with one or more macromolecule membrane structures including membrane proteins selectively permeable to water molecules and fixed within a pore.

BACKGROUND

With the development of industry, there has been a rapid growth of interest in a liquid filtration structure for removing pollutants from fluids. In particular, due to the increase in environmental pollution and population, the lack of drinking water is a pending problem for the whole mankind.

A reverse osmosis membrane, which is a representative conventional separation membrane with high selectivity, provides selectivity to water by allowing only water molecules to pass through a free volume, as a permeation channel, present between polymer chains formed of a polymer constituting an active layer and blocking other molecules or ions. Herein, the free volume as a permeation channel does not have a structure aligned in a direction or a through-type structure, but has a severely tangled or winding structure. Therefore, even a thin active layer has a very complicated and long permeation channel, and, thus, has excellent selectivity but poor permeability.

Meanwhile, a porous separation membrane having a porous structure, such as a nanofilter (NF), and a microfilter (MF) has a through-type porous structure, but it is too large to select water molecules or specific ions. Therefore, the porous separation membrane has excellent permeability but poor selectivity.

Further, a water filtration system in which a recombinant aquaporin is located in a vesicle membrane has poor durability due to instability of a lipid membrane structure.

Accordingly, there has been a demand for the development of a new liquid filtration structure which reduces instability of a lipid membrane structure when using a vesicle filtration system and thus has excellent durability.

SUMMARY

The present disclosure has been made in an effort to provide a liquid filtration structure which includes one or more macromolecule membrane structures including membrane proteins increase stability within a pore of a porous support, and, thus, has high filtration efficiency and excellent permeability and durability.

An exemplary embodiment of the present disclosure provides a liquid filtration structure including: a porous support including a plurality of pores of which an inner wall is linked to first linkers; and one or more macromolecule membrane structures including membrane proteins selectively permeable to water molecules, and second linkers. Herein, the first linkers and the second linkers are connected by first connection parts and the macromolecule membrane structures are fixed to the inner wall of the pore of the porous support.

According to the exemplary embodiment, the macromolecule membrane may be any membrane formed of macromolecules which can constitute a membrane, and may be, for example, but not limited to, a lipid monolayer membrane or a lipid bilayer membrane.

According to the exemplary embodiment, the membrane proteins selectively permeable to water molecules may be aquaporin-based proteins.

Aquaporin is a membrane protein responsible for passive transport of water in a cell membrane, and selectively induces water molecules to the inside and outside of cells while blocking movements of ions and other solutes. For example, the aquaporin may include all of aquaporin-based proteins expressed in human bodies, plants, or bacteria, and may include, yeast aquaporin Aqy1, plant aquaporin SoPIP2;1, aquaglyceroporin, i.e., Aqp3, or bacteria aquaporin AqpZ. Further, the aquaporin may be a recombinant protein obtained by artificially expressing the above-described aquaporin-based proteins by the recombinant DNA technology.

Since aquaporin is selected as the membrane proteins, the liquid filtration structure of the present disclosure passes through the proteins included in the porous support, and, thus, selectively and efficiently filters water.

According to the exemplary embodiment, the first linker or the second linkers may include one or more selected from the group consisting of a primary amine reactive cross-linker, a sulfhydryl reactive cross-linker, a carbohydrate reactive cross-linker, a carboxyl reactive cross-linker, and a photoreactive cross-linker.

The primary amine reactive cross-linker may be, for example, but not limited to, imidoesters, N-hydroxysuccinimide ester, or glutaraldehyde, and the sulfhydryl reactive cross-linker may be, for example, but not limited to, maleimide, haloacetyl, or pyridyldisulfide.

Meanwhile, the carbohydrate reactive cross-linker may be, for example, but not limited to, 1-(3-dimethylaminopropyl)-3-ethylcarbodiimide hydrochloride or 1,3-dicyclohexyl carbodiimide, and the photoreactive cross-linker may be, for example, but not limited to, aryl azide or diazirine.

Besides, polynucleotide or polydopamine may be used as the first linkers or the second linkers.

The macromolecule membrane structures need the connection parts configured to connect the first linkers and the second linkers in order to be fixed to the inner wall of the pore formed in the porous support. Since the one or more macromolecule membrane structures are connected to the inner wall of the pore through the first linkers and the second linkers, the macromolecule membrane structures can be stably fixed within the pore.

According to the exemplary embodiment, the one or more macromolecule membrane structures may be cross-linked to each other through second connection parts configured to connect the second linkers on the different macromolecule membrane structures. Since the one or more macromolecule membrane structures are connected to each other through the second linkers and the second connection parts, the macromolecule membrane structures can be stably fixed within the pore of the porous support.

According to the exemplary embodiment, the first connection parts or the second connection parts may be any compound capable of connecting the first linkers and/or the second linkers on the different macromolecule membrane structures, and may be preferably hydrocarbon and most preferably polyethylene glycol.

Meanwhile, the macromolecule membrane structures may further include a substance that inhibits fluidity of a membrane constituting the macromolecule membrane. That is, by inhibiting fluidity of the macromolecule membrane to further harden the macromolecule membrane, stability of the macromolecule membrane structures can be increased.

According to the exemplary embodiment, the substance that inhibits fluidity of a membrane may include one or more selected from the group consisting of lipids including cholesterol, sphingolipid, and hydrocarbon having 10 or more carbon atoms, but may is not limited thereto.

According to the exemplary embodiment, the macromolecule membrane structure may be a lipid monolayer membrane or a lipid bilayer membrane, and lipid which can be suitably used for the lipid monolayer membrane or lipid bilayer membrane may be phosphatidylcholine, phosphatidylserine, phosphatidylethanolamine, phosphatidylglycerol, phosphatidylinositol, cardiolipin, cholesterol, and sphingomyelin. To be more specific, lipid to be suitably used in the present disclosure may include macromolecule-based AB, ABA, or ABC copolymers such as asolectin, diphytanoyl-phosphatidylcholine (DPhPC), DPPC (1,2-dipalmitoyl-sn-glycero-3-phosphocholine), DHPC (1,2-diheptanoyl-sn-glycero-3-phosphocholine), DHPE (1,2-dihexanoyl-sn-glycero-3-phosphoethanolamine), DMPC (1,2-dimyristoyl-sn-glycero-3-phosphocholine), DIODPC (1,2-DiODodecyl-sn-Glycero-3-Phosphocholine), DMPS (dimyristoyl phosphatidylserine), DLPC (dimyristoyl phosphatidylglycerol dilauroyl phosphatidycholine), DMPE (1,2-dimyristoyl-sn-glycero-3-phosphoethanolamine), DMPG (1,2-dimyristoyl-sn-glycero-3-[phospho-rac-(1-glycerol)]), lyso PC(1-myristoyl-2-hydroxy-sn-glycero-3-phosphocholine), lyso PE (1-oleoyl-2-hydroxy-sn-glycero-3-phosphoethanolamine), DDPC (1,2-didecanoyl-sn-glycero-3-phosphocholine), DEPA-NA (1,2-dierucoyl-sn-glycero-3-phosphate (sodium salt)), DEPC (1,2-erucoyl-sn-glycero-3-phosphocholine), DEPE (1,2-dierucoyi-sn-alycero-3-phosphoethanolamine), DLOPC (1,2-linoleoyl-sn-glycero-3-phosphocholine), DLPA-NA (1,2-dilauroyl-sn-glycero-3-phosphate (sodium salt)), DLPE (1,2-dilauroyl-sn-glycero-3-phosphoethanolamine), DLPS-NA (1,2-dilauroyl-sn-glycero-3-phosphoserine (sodium salt)), DMPA-NA (1,2-dimyristoyl-sn-glycero-3-phosphate (sodium salt)), DMPS-NA (1,2-dimyristoyl-sn-glycero-3-phosphoserine (sodium salt)), DOPA-NA (1,2-dioleoyl-sn-glycero-3-phosphate (sodium salt)) DOPC (1,2-oleoyl-sn-glycero-3-phosphocholine), DOPE (1,2-dioleoyl-sn-glycero-3-phosphoethanolamine), DOPS-NA (1,2-dioleoyl-sn-glycero-3-phosphoserine (sodium salt)), DPPA-NA (1,2-dipalmitoyl-sn-glycero-3-phosphate (sodium salt)), DPPE (1,2-dipalmitoyl-sn-glycero-3-phosphoethanolamine), DPPS-NA (1,2-dipalmitoyl-sn-glycero-3-phosphoserine (sodium salt)), DSPA-NA (1,2-distearoyl-sn-glycero-3-phosphate (sodium salt)), DSPC (1,2-distearoyl-sn-glycero-3-phosphocholine), DSPE (1,2-diostearpyl-sn-glycero-3-phosphoethanolamine), MSPC (1-myristoyl, 2-stearoyl-sn-glycero-3-phosphocholine), PMPC (1-palmitoyl, 2-myristoyl-sn-glycero-3-phosphocholine), POPC (1-palmitoyl, 2-oleoyl-sn-glycero-3-phosphocholine), POPE (1-palmitoyl-2-oleoyl-sn-glycero-3-phosphoethanolamine), PSPC (1-palmitoyl, 2-stearoyl-sn-glycero-3-phosphocholine), SMPC (1-stearoyl, 2-myristoyl-sn-glycero-3-phosphocholine), SOPC (1-stearoyl, 2-palmitoyl-sn-glycero-3-phosphocholine), SPPC (1-stearoyl, 2-palmitoyl-sn-glycero-3-phosphocholine), PCDA (10,12-pentacosadiynoic acid), and PMOXA-PDMS-PMOXA(poly(methyloxazoline)-poly(dimethylsiloxane)-poly(methyloxazoline), and polypeptide-based copolymers, but is not limited thereto.

According to the exemplary embodiment, the pore may have a diameter of 50 nm to 100 µm, and may have a bottleneck part in a thickness direction of the porous support.

According to the exemplary embodiment, the porous support is not particularly limited as long as it has a porous structure, and may be formed of, for example, a polymer or anodic aluminum oxide.

According to the exemplary embodiment, the polymer may include a member selected from the group consisting of, for example, polysulfone, polyethersulfone, polyphenylsulfone, polyetherethersulfone, polyetherketone, polyetheretherketone, polyphenylene ether, polydiphenylphenylene ether, polyvinylene cellulose acetate, cellulose diacetate, cellulose triacetate, polyphenylene sulfide, nitrocellulose, acetylated methylcellulose, polyacrylonitrile, polyvinylalcohol, polycarbonate, organic siloxane carbonate, polyestercarbonate, organic polysiloxane, polyethylene oxide, polyamide, polyimide, polyamidoimide, and polybenzimidazole, but is not limited thereto.

Meanwhile, the liquid filtration structure according to the present disclosure may include a permeable membrane disposed on an upper end and a lower end of the porous support.

According to the exemplary embodiment, the permeable membrane may include one member selected from the group consisting of, for example, polysulfone, polyethersulfone, polyphenylsulfone, polyetherethersulfone, polyetherketone, polyetheretherketone, polyphenylene ether, polydiphenylphenylene ether, polyvinylene cellulose acetate, cellulose diacetate, cellulose triacetate, polyphenylene sulfide, nitrocellulose, acetylated methylcellulose, polyacrylonitrile, polyvinylalcohol, polycarbonate, organic siloxane carbonate, polyestercarbonate, organic polysiloxane, polyethylene oxide, polyamide, polyimide, polyamidoimide, polybenzimidazole, and combinations thereof, but is not limited thereto.

According to the exemplary embodiment, the porous support may have a thickness of 1 µm to 1 mm, preferably 1 µm to 100 µm, more preferably 10 µm to 100 µm, and most preferably 40 µm to 100 µm.

Another exemplary embodiment of the present disclosure provides a liquid filtration structure including: a porous support including a plurality of pores; and one or more macromolecule membrane structures including membrane proteins selectively permeable to water molecules, and second linkers. Herein, the one or more macromolecule membrane structures are cross-linked to each other through second connection parts configured to connect the second linkers on the different macromolecule membrane structures.

In the liquid filtration structure, the one or more macromolecule membrane structures in a pore formed in the porous support are connected to each other through the second linkers and the second connection parts. Thus, this liquid filtration structure is the same as the above-described liquid filtration structure except that the one or more macromolecule membrane structures are fixed to an inner wall through the linkers and the connection parts. Therefore, descriptions of the common parts between these two liquid filtration structures will be omitted to avoid complexity of the present specification.

According to the exemplary embodiments of the present disclosure, a liquid filtration structure increases stability and durability of macromolecule membrane structures including membrane proteins selectively permeable to water molecules, and, thus, can be effectively used in a filtration device for purifying water.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
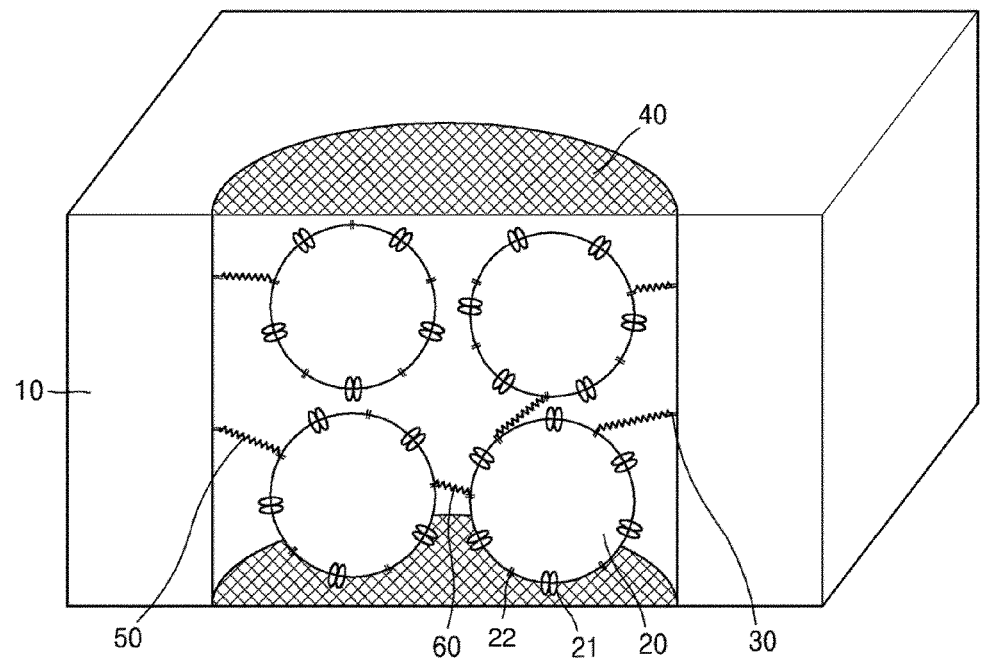
FIG. 1 is a perspective view schematically illustrating that one or more macromolecule membrane structures of a liquid filtration structure is fixed to an inner wall of a pore according to an exemplary embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Hereinafter, the present disclosure will be described in detail with reference to the accompanying drawings.

The present disclosure suggests a liquid filtration structure configured to stably fix one or more macromolecule membrane structures including membrane proteins selectively permeable to water molecules within a pore formed in a porous support or increase durability.

FIG. 1 is a perspective view schematically illustrating that one or more macromolecule membrane structures of a liquid filtration structure is fixed to an inner wall of a pore according to an exemplary embodiment of the present disclosure. In a porous support 10, a plurality of pores is formed. A first linker 30 on an inner wall of the pore is connected to a second linker 22 present on a macromolecule membrane structure 20 through a first connection part 50. Such connection enables the macromolecule membrane structure 20 to be stably fixed within the pore of the porous support 10.

Figure 2:
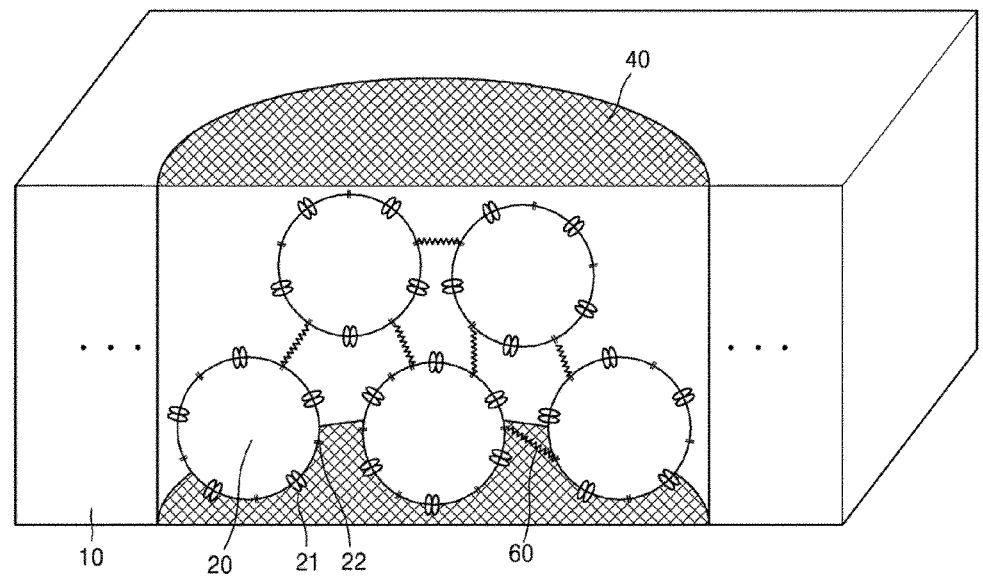
FIG. 2 is a perspective view schematically illustrating that one or more macromolecule membrane structures of a liquid filtration structure is included inside a pore according to an exemplary embodiment it of the present disclosure.

FIG. 2 is a perspective view schematically illustrating that one or more macromolecule membrane structures of a liquid filtration structure is included inside a pore according to an exemplary embodiment of the present disclosure. As illustrated in FIG. 2, a plurality of the macromolecule membrane structures 20 is present within a pore. Thus, the second linkers 22 on the different macromolecule membrane structures 20 can be connected to each other through a second connection part 60 such that the linking between the macromolecule membrane structures 20 can be further strengthened and the macromolecule membrane structures 20 can be stably present within a pore formed in the porous structure 10.

On the macromolecule membrane structure 20, membrane proteins, such as aquaporin 21, selectively permeable water molecules are present. Thus, water can be purified.

Further, a permeable membrane 40 may be disposed on an upper end and a lower end of the porous support 10 in order to suppress one or more macromolecule membrane structures 20 from being leaked to the outside of the pore.

Meanwhile, the macromolecule membrane structures 20 may further include a substance (for example, sphingolipid or the like) that inhibits fluidity of a membrane constituting a macromolecule membrane. By inhibiting fluidity of the macromolecule membrane to further harden the macromolecule membrane, stability of the macromolecule membrane structures can be increased.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A liquid filtration structure comprising:
   a porous support including a plurality of pores of which an inner wall is linked to first linkers; and
   one or more macromolecule membrane structures including membrane proteins selectively permeable to water molecules, and second linkers,
   wherein the first linkers and the second linkers are connected by first connection parts and the macromolecule membrane structures are fixed to the inner wall of the pore of the porous support, and
   wherein the macromolecule membrane structures further comprise a substance that inhibits fluidity of a membrane constituting the macromolecule membrane.

2. The liquid filtration structure of claim 1, wherein the one or more macromolecule membrane structures are cross-linked to each other through second connection parts configured to connect the second linkers on the different macromolecule membrane structures.

3. The liquid filtration structure of claim 1, wherein the first connection parts are polyethylene glycol.

4. The liquid filtration structure of claim 2, wherein the second connection parts are polyethylene glycol.

5. The liquid filtration structure of claim 1, wherein the substance that inhibits fluidity of a membrane includes one or more selected from the group consisting of lipids including cholesterol, sphingolipid, and hydrocarbon having 10 or more carbon atoms.

6. The liquid filtration structure of claim 1, further comprising:
   a permeable membrane disposed on an upper end and a lower end of the porous support.

7. The liquid filtration structure of claim 1, wherein the first linker includes one or more selected from the group consisting of a primary amine reactive cross-linker, a sulfhydryl reactive cross-linker, a carbohydrate reactive cross-linker, a carboxyl reactive cross-linker, a photoreactive cross-linker, polynucleotide, and polydopamine.

8. The liquid filtration structure of claim 1, wherein the second linkers include one or more selected from the group consisting of a primary amine reactive cross-linker, a sulfhydryl reactive cross-linker, a carbohydrate reactive cross-linker, a carboxyl reactive cross-linker, and a photoreactive cross-linker.

9. The liquid filtration structure of claim 1, wherein the pore has a diameter of 50 nm to 100 µm.

10. The liquid filtration structure of claim 1, wherein the pore has a bottleneck part in a thickness direction of the porous support.

11. The liquid filtration structure of claim 1, wherein the porous support is formed of a polymer or anodic aluminum oxide.

12. The liquid filtration structure of claim 11, wherein the polymer is polysulfone, polyethersulfone, polyphenylsulfone, polyetherethersulfone, polyetherketone, polyetheretherketone, polyphenylene ether, polydiphenylphenylene ether, polyvinylene cellulose acetate, cellulose diacetate, cellulose triacetate, polyphenylene sulfide, nitrocellulose, acetylated methylcellulose, polyacrylonitrile, polyvinylalcohol, polycarbonate, organic siloxane carbonate, polyestercarbonate, organic polysiloxane, polyethylene oxide, polyamide, polyimide, polyamidoimide, or polybenzimidazole.

13. The liquid filtration structure of claim 1, wherein the porous support has a thickness of 1 µm to 1 mm.

14. The liquid filtration structure of claim 1, wherein the membrane proteins selectively permeable to water molecules are aquaporin.

15. A liquid filtration structure comprising:
    a porous support including a plurality of pores; and
    one or more macromolecule membrane structures including membrane proteins selectively permeable to water molecules, and second linkers,
    wherein the one or more macromolecule membrane structures are cross-linked to each other through second connection parts configured to connect the second linkers on the different macromolecule membrane structures, and
    wherein the macromolecule membrane structures further comprise a substance that inhibits fluidity of a membrane constituting the macromolecule membrane.

16. The liquid filtration structure of claim 15, wherein the second linkers include one or more selected from the group consisting of a primary amine reactive cross-linker, a sulfhydryl reactive cross-linker, a carbohydrate reactive cross-linker, a carboxyl reactive cross-linker, a photoreactive cross-linker, polynucleotide, and polydopamine,
    the primary amine reactive cross-linker is imidoesters, N-hydroxysuccinimide ester, or glutaraldehyde,
    the sulfhydryl reactive cross-linker is maleimide, haloacetyl, or pyridyldisulfide,
    the carbohydrate reactive cross-linker is 1-(3-dimethylaminopropyl)-3-ethylcarbodiimide hydrochloride or 1,3-dicyclohexyl carbodiimide, and
    the photoreactive cross-linker is aryl azide or diazirine.

17. The liquid filtration structure of claim 15, wherein the pore has a diameter of 50 nm to 100 µm.

18. The liquid filtration structure of claim 15, wherein the porous support has a thickness of 1 µm to 1 mm.

19. The liquid filtration structure of claim 15, wherein the membrane proteins selectively permeable to water molecules are aquaporin.

* * * * *